Patented Apr. 12, 1949

2,467,145

UNITED STATES PATENT OFFICE 2,467,145

LUBRICANT

Arnold J. Morway, Clark, and John C. Zimmer, Union, N. J., assignors to Standard Oil Development Company, a corporation of Delaware No Drawing. Application December 30, 1944, Serial No. 570,778

2 Claims. (Cl. 252—29)

This invention relates to lubricants, and especially lubricants adapted for high temperature and chemical, corrosive services particularly on packings, valves, stuffing boxes, pet cocks or stop cocks, pump bearings, glands, and the like, in contact with aqueous solutions, acids, alkalies, reactive chemicals, hydrocarbons, alcohols, solvents, gasoline, and the like.

In recent technical literature, the preparation and properties of many commercially significant fluorinated hydrocarbon derivatives have been described. Particular features of these compounds are their high degree of chemical and physical stability and high degree of chemical inertness to the common acids, alkalies and solvents. Moreover, the compounds may be prepared from an extensive variety of materials including such commercially available materials as coal tar and petroleum distillates and petroleum waxes, alcohols, ethers and other oxygenated hydrocarbons, amines, chlorine or bromine hydrocarbon derivatives. The present invention is an extended use of these fluorinated compounds in the preparation of lubricants, especially greases, particularly adapted for use over a wide temperature range.

The fluoro-organic compounds have been employed in the lubricating industry as additives to mineral oils in the preparation of extreme pressure lubricants. For these uses, these high molecular weight fluorinated compounds have been found extremely satisfactory. However, endeavors to form grease-like compositions by incorporating therein the usual grease-forming soaps have been unsuccessful. Indeed, such soaps are insoluble, non-dispersible and incompatible with the fluoro-organic compounds. In the present invention, fluorinated compounds having boiling points above 85° C. at atmospheric pressure and viscosity between 30 and 2,000 Saybolt Universal seconds at 210° F. are advantageously employed as one of the main constituents of grease-like compositions. These fluorinated compounds have from 5 to 50 carbon atoms in the molecule.

Typical fluoro-organic compounds utilized in this invention are: heptafluoropentane ($C_5H_5F_7$), actafluoropentane ($C_5H_3F_8$), dodecafluoropentane ($C_5F_{12}$), and similar derivatives of such hydrocarbons as pentadecane and eicosane and other cyclic, isomeric and normal aliphatics of 5 to 50 carbon atoms, in which at least half of the hydrogen atoms are replaced by fluorine atoms. These fluorinated hydrocarbons contain from about 60 to about 80% fluorine, from about 20 to about 37% carbon and from 0 to about 3% hydrogen. The most suitable compounds are those in which substantially all of the hydrogen has been replaced by fluorine. These compounds, therefore, may be suitably termed fluoro-organic compounds having from 5 to 50 carbon atoms in the molecule in which the number of fluorine atoms in the molecule exceeds the number of carbon atoms in the molecule by at least 1. If desired, other substitutents such as Cl, Br, OH, COOH, HCO, $NH_2$, $NR_2$, SR, SH and RSR may be present in the fluorinated oils.

These fluorinated organic compounds have been found to compound readily with carbon blacks, particularly acetylene (Shawinigan) black and channel black, in amounts between 5 and 40% to form compositions of grease-like structure and having grease-like properties. The carbon black is compounded with the fluorine compounds either as a pseudo solution or as a dispersed phase. In either case, however, the incorporation of the carbon black into the fluoro-organic compounds does not adversely affect their desirable viscosity temperature characteristics. It would seem, however, that the carbon black, especially the structure black, exerts an inhibitory effect to the decomposition of the fluorinated hydrocarbons in that, in the absence of carbon black, the fluorinated hydrocarbons decompose at a lower temperature than in the presence of carbon black. The grease compositions prepared by incorporating carbon black into the fluorinated hydrocarbons do not thin out under high temperatures, but under excessively high temperatures the fluorinated hydrocarbons decompose or boil off, leaving a soft, fluffy residue of carbon black. This carbon black, if collected, can be redispersed in the fluorinated hydrocarbons again to prepare grease compositions.

The following examples are presented for the purpose of giving a further understanding of the invention and not indicative of any limitations in connection with the invention. Representative of a group of grease compositions, 10 to 20% of carbon black (thixotropic or structure-forming ink black such as those obtained from partial combustion of natural gas or light hydrocarbon fractions) was incorporated in 80 to 90% fluorinated gas oil. The incorporation of the carbon black was effected by dispersing the carbon black in the fluorinated compound by thorough agitation such as stirring, milling or mixing in the usual scraped grease type kettle for about one hour until complete dispersion, that is, until the composition could be passed through a 28 x 500 screen without leaving any dry carbon black residue. No heating was applied during the dispersion. Similar compositions can also be readily prepared using acetylene blacks such as obtained by thermal decomposition of acetylene and similar unsaturated hydrocarbons.

The grease compositions thus prepared have a typical greaselike structure apparently due to an interrelationship between the carbon black and the fluorinated organic compound. The grease compositions are characterized by being highly chemically and physically stable, inert to common acids and alkalies, and insoluble in hydrocarbon and aqueous solvents. Moreover, the compositions when centrifuged at 3000 R. P. M. for 24 hours did not show any separation of constituents. The compositions appear to have no melting points, at least they do not liquefy at temperatures as high as 900° F.

If desired, modifying or addition agents such as hydrocarbon esters, silicone polymers, amines, alkyanolamine, extreme pressure agents such as sulfur, chlorine or phosphorus, their hydrocarbon or oxygenated hydrocarbon derivatives, phosphorous sulfides, chlorinated hydrocarbons or oxygenated hydrocarbons, sulfo-chlorine compounds such as Parapoid, mercaptides, sulfides, thio-ethers, metal soap such as lead oleate, metal derivatives of phenol sulfides or thio-phosphates, rust preventatives such as sulfonates or degras, may be incorporated in the carbon black fluorinated lubricants to secure special characteristics in accordance with the established art on specialized lubricants.

What is claimed is:

1. A lubricant grease of solid consistency consisting essentially of 5% to 40% by weight of acetylene black incorporated in a substantially hydrocarbon-insoluble, inert fluorinated hydrocarbon mixture of 60 to 80% fluorine content by weight obtained by direct fluorination of a gas oil fraction.

2. A lubricant as in claim 1 in which substantially all of the hydrogen atoms of the gas oil have been replaced by fluorine atoms.

ARNOLD J. MORWAY.
JOHN C. ZIMMER.

REFERENCES CITED

The following references are of record in the file of this patent:

UNITED STATES PATENTS

| Number | Name | Date |
|---|---|---|
| 1,880,987 | Silhavy | Oct. 4, 1932 |
| 2,186,916 | Wiezevich | Jan. 9, 1940 |
| 2,291,166 | Maag | July 28, 1942 |
| 2,335,933 | Goheen | Dec. 7, 1943 |
| 2,349,058 | Swenson | May 16, 1944 |
| 2,411,159 | Hanford | Nov. 19, 1946 |

OTHER REFERENCES

"Uses and Applications of Chemicals and Related Material," Reinhold Publishing Corp., New York, N. Y., 1939, Thomas C. Gregory.

Canadian Chem. & Metallurgy, vol. 17, May 1933. Article by Kaufman, entitled "Acetylene Carbon Black," pages 93–95.